June 19, 1945. S. B. BECKER 2,378,531
CATALYTIC CONVERSION OF RESIDUAL HYDROCARBON OILS
Filed Sept. 30, 1941
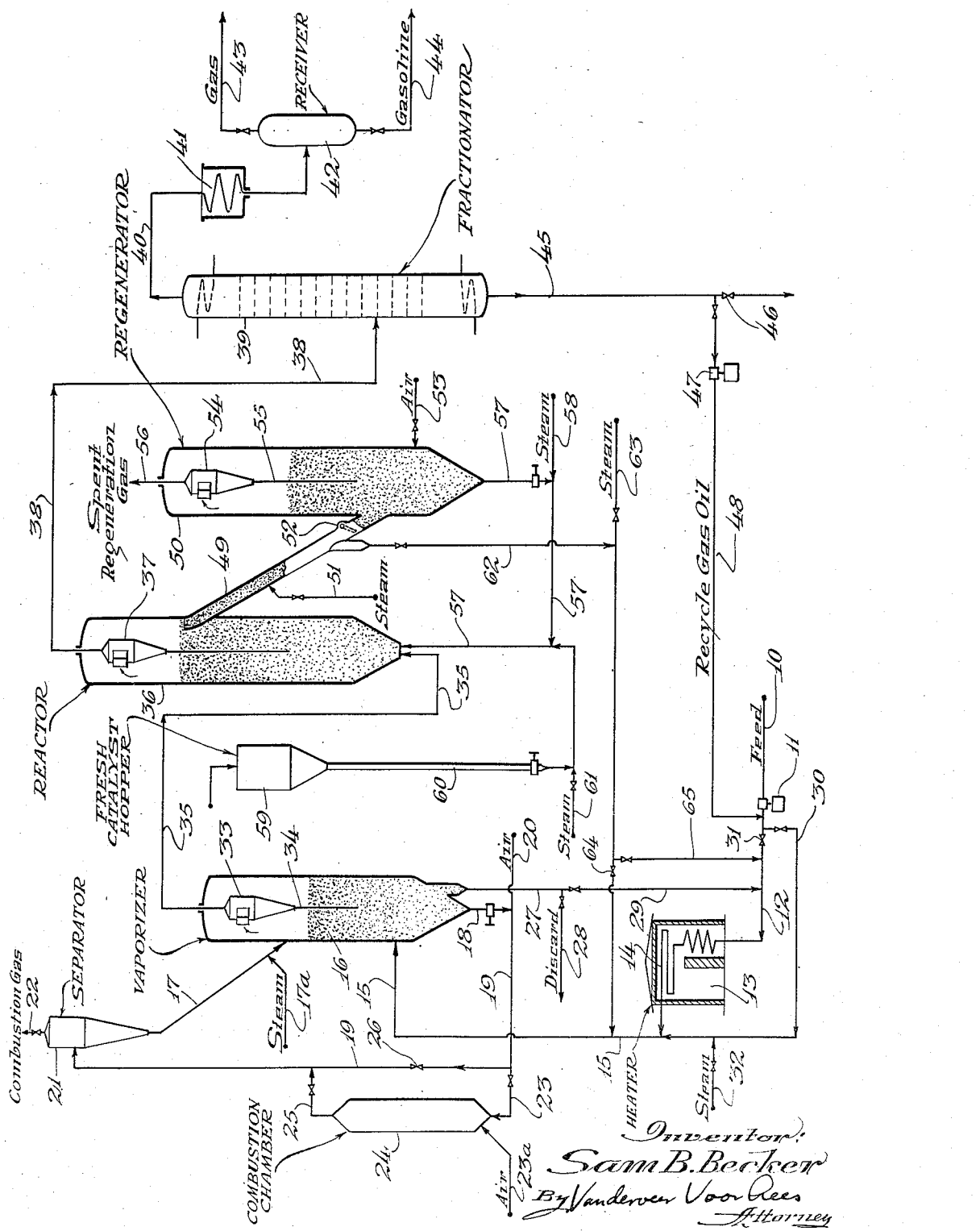
Inventor:
Sam B. Becker
By Vanderveer Voorhees
Attorney Patented June 19, 1945

2,378,531

UNITED STATES PATENT OFFICE 2,378,531

CATALYTIC CONVERSION OF RESIDUAL HYDROCARBON OILS

Sam B. Becker, Chicago, Ill., assignor to Standard Oil Company, Chicago, Ill., a corporation of Indiana Application September 30, 1941, Serial No. 412,942

7 Claims. (Cl. 196—52)

This invention relates to the conversion of hydrocarbon oils and particularly heavy oils, such as petroleum residuums and heavy gas oils, into gasoline. The invention also relates to an apparatus for carrying out the desired conversion. More specifically the invention relates to improvements in the process of converting unvaporizable residual oils by the action of subdivided, solid catalysts at high temperature.

One object of the invention is to increase the life of the catalyst in such a conversion process. Another object of the invention is to treat the heavy oil preliminarily immediately before contacting with the catalyst, thereby removing from the oil certain impurities which adversely affect the life of the catalyst. A more specific object of the invention is to remove inorganic salts from the oil in a novel manner and to prevent their contamination of the catalyst. Other and more detailed objects, advantages and uses of my invention will become apparent as the description thereof proceeds.

Heretofore, it has been the practice to effect the conversion of hydrocarbon oils, particularly distillate oils and distillable oils such as light gas oil, by initially vaporizing the oils in a heater and contacting the vapors with the catalyst. In the case of residual oils, however, it is not possible to effect their complete vaporization without carbonization and if this is done by purely thermal means, it has been found that considerable cracking of the oil occurs with the formation of non-catalytic gasoline which is of undesirably low knock rating. Gasoline produced from the thermal conversion of Mid-Continent residuum will ordinarily have a knock rating of the order of 55 to 60 A. S. T. M.

In order to avoid this undesirable thermal cracking of residual charging stocks, it has been proposed to inject these stocks directly into a catalytic reactor to which the necessary heat for conversion is supplied by other means. When this is done with suspended, solid catalysts, difficulty has been encountered due to the accumulation on the catalyst of small amounts of inorganic salts present in certain petroleum residuums. As examples of such salts, there may be mentioned particularly sodium chloride, calcium chloride and magnesium chloride. Some crudes contain no salt or merely traces of salt. In other crudes the amount of salt present, estimated as sodium chloride, may vary from 25 pounds to 200 pounds per 1000 barrels of crude oil. The salt content of typical Mid-Continent crudes has been found to vary from 42 to 148 pounds per 1000 barrels. Inasmuch as the salt is largely concentrated in the residuum on distillation and the residuum is frequently 25 to 50% of the crude oil, it will be seen that the amount of salt in the residuum, estimated as sodium chloride, may be from 50 to 800 pounds per 1000 barrels of residuum charging stock. Various methods have been devised for removing salt from oil. The operation adds a considerable expense to the processing of the oil and none of the commercial methods employed succeed in completely removing the salt but only removing a fraction of it.

My process of converting salt-containing residuums into gasoline involves treating the residuum at high temperature with a solid, suspended, adsorbent material which adsorbs the salt and simultaneously carbonizes those high molecular weight, relatively unstable, carbon-forming ingredients of the charging stock, thereby producing clean hydrocarbon vapor from the residuum which is immediately converted into gasoline in a separate zone by a suspended, powdered, solid, conversion catalyst.

My invention is illustrated by a drawing which shows diagrammatically an apparatus for carrying out the process. Referring to the drawing, a suitable charging stock, which may be 40% residuum from Mid-Continent crude oil and which may contain the equivalent of $\frac{1}{16}$ of a pound of salt per barrel, is charged by line 10 and pump 11 through line 12 to heater 13 where it is heated in a continuous stream in coil 14 to a temperature which is not sufficiently high to effect any substantial amount of cracking. A suitable temperature for this stock leaving heater 13 will be about 700 to 800° F. If heated sufficiently rapidly in coil 14 and for a sufficiently short time, a somewhat higher temperature may be employed without producing substantial thermal conversion of the oil. For example, a temperature of 850 to 875° F. may be employed under certain conditions and with certain types of charging stock.

From heater 13 the partially vaporized oil is conducted by line 15 to vaporizing chamber 16 which contains a turbulent mass of suspended, adsorbent material in the form of fine granules or powder. Various adsorbent materials may be employed such as fuller's earth, crushed firebrick, magnesia, sea sand, pumice, clay, diatomaceous earth or other suitable refractory materials. In general, I prefer to employ partially spent catalyst from the hydrocarbon conversion process to be described in more detail later. The temperature in vaporizer 16 is maintained sufficiently high to effect decomposition of carbon-forming material present in the feed stock. A suitable temperature is about 950 to 1025° F. Heat for maintaining this temperature is largely supplied by continuously adding to the preheater additional highly heated, adsorbent, solid material through line 17. The temperature of this material will ordinarily be about 1200 to 2000° F. It is preferred to employ sufficient turbulence and vapor velocity in vaporizer 16 to keep the adsorbent material suspended as a "dense phase." Three well defined systems of powdered solid and vapor are recognized. The first is the dispersed phase in which the particles of solid are distributed throughout the vapor space, a condition generally obtained where turbulence is high. The second is the dense phase in which the solid particles, responding to the effects of gravity, are collected as a layer and very much resemble a fluid. The particles are separated from one another by a vapor envelope. The third system is the so-called "compact phase" which results when the suspension is permitted to settle in a quiescent zone and the solid particles are in direct contact with one another. Transition from the dense phase to the compact phase may be prevented by controlling the amount of turbulence and in general an upward vapor velocity of the order of 1 to 5 feet per second, more or less, is sufficient to maintain the dense phase but not sufficient to produce a disperse phase.

The amount of adsorbent material in vaporizer 16 may be controlled by controlling the level of the dense phase therein either by automatic level detection means or better by continually determining the pressure drop from top to bottom of the vaporizer which gives a measure of the height of the column of suspension therein. To maintain the level, adsorbent material is withdrawn continuously or intermittently from the bottom of the vaporizer by valved line 18 connecting to line 19 through which catalyst may be impelled or conveyed by a stream of gas, for example, air introduced by valved inlet 20. Air introduced at 20 may be diluted with inert gas (flue gas, steam, etc.) to control the amount of oxygen and thereby control the combustion of carbonaceous material on the adsorbent solid. Sufficient oxygen or air should be introduced to induce combustion to the extent of increasing the temperature of the solids to the desired recycle temperature, e. g., 1600 to 2000° F., but when spent catalyst is used, a temperature of 1100 to 1200° F. may be employed. Combustion gases are separated from the catalyst in separator 21 which may be of the cyclone type, the gases being discharged by line 22 and the hot solids being returned to the vaporizer by line 17 as hereinabove described. Steam or other suitable gas may be introduced by line 17a to aerate the stream of solid material flowing through line 17. Spent combustion gases in 22 will carry away, in the form of dust particles, salts liberated from the solid, porous material by combustion of carbon accumulated thereon. If desired, the suspension of solids and carrier gas flowing through line 19 may be diverted through valved line 23 into chamber 24 and thence by valved line 25 leading to separator 21, valve 26 being closed. In chamber 24 additional time for combustion of carbonaceous material is provided while the solids flow upwardly through the said chamber in the form of a suspension. If desired, sufficient time may be provided in chamber 24 to effect substantially complete removal of carbonaceous matter from the solids, but in general it is not necessary to remove the carbon and carbon may be recycled to the vaporizer.

A portion of the solids from the bottom of vaporizer 16 may be withdrawn by line 27 and discarded from the system from time to time by valved line 28. If desired, some of this adsorbent material may be charged to the heater coil 14 by valved line 29 wherein it serves to adsorb asphaltic and carbonaceous material from the oil undergoing heating and thereby assists in preventing coking of the heater coils 14. The amount of solid material thus employed may be of the order of 1 to 5 pounds or even 10 pounds per barrel of oil charged to the heater. It is essential that the temperature of the vaporizer 16 may be maintained at all times above the point of condensation of tar from the vapors therein and when starting operation of the process, it is important that the vaporizer be brought up in temperature before charging any of the heavy oil thereto inasmuch as accumulation of tar in the base of the vaporizer would stop the flow of dry solids and speedily bring about a shutdown of the apparatus. Thus, the apparatus may be started up on a lighter oil such as gas oil.

It is not necessary to preheat the feed stock in heater 13 and the heater may be by-passed by valved line 30, valve 31 being closed. The feed stock may then enter the vaporizer directly and all the necessary heat for carbonization and vaporization may be supplied from the hot, solid material introduced through line 17. In order to effect rapid dispersion of the heavy reduced crude in the vaporizer when operating in this way, it is desirable to introduce a dispersing gas or vapor with the feed stock. Steam introduced by line 32 will accomplish this purpose. Likewise, a vaporizable oil, such as gas oil, may be charged through heater 13 simultaneously with the introduction of reduced crude oil through line 30.

The hydrocarbons are permitted to remain in the vaporizer only long enough for complete vaporization to take place, generally less than 40 seconds and preferably less than 25 seconds, for example, 5 to 20 seconds. Very little gasoline is formed in the vaporizer if any, the purpose being to eliminate impurities harmful to the catalyst in the later stage.

From vaporizer 16 the vapors are withdrawn through internal cyclone separator 33 which separates solid material and adsorbed impurities, salt, etc., from the vapors. The fine solids are conducted to the lower part of the vaporizer by dip leg 34 while the hydrocarbon vapors, now substantially free of salts, are conducted by vapor line 35 which should be as short as practically possible, leading to reactor 36 wherein the vapors are contacted with a suspended, solid, conversion catalyst, also preferably in the form of a dense phase. For this purpose acid treated montmorillonite, clay, activated silica, activated alumina and mixtures of active silica and alumina, silica and active magnesia, etc. may be employed. Silica gel promoted with various metal oxides, such as thoria, zirconia and magnesia, may be used effectively. In general the conversion catalysts employed in reactor 36 are siliceous materials containing about 60 to 95% of active silica. Sufficient time of contact between catalyst and oil is provided in 36 to effect a conversion into gasoline of the order of 25 to 50% of the hydrocarbons charged. The conversion products are separated from catalyst in internal cyclone 37 and the hydrocarbon vapors are conducted by vapor line 38 into fractionator 39 shown in highly schematic form wherein gasoline and lighter hydrocarbons are taken overhead by vapor line 40 to condenser 41 leading to receiver 42 from which fixed gases are withdrawn by valved line 43 and gasoline by line 44. Products boiling higher than gasoline are withdrawn from the base of fractionator 39 by line 45 and may be discharged from the system by line 46 or they may be recycled by pump 47 and line 48 back to the vaporizer 16, either through furnace 13 or directly by line 30 and line 15, as indicated. A very small amount of catalyst from reactor 36, not separated from the vapors in cyclone 37, will accumulate in the heavy products in line 45 and this material will thus be transferred from the reactor to the vaporizer. If desired, this stock containing catalyst may be recycled to the reactor.

Spent catalyst from reactor 36 is withdrawn continuously by catalyst transfer line 49 leading to regenerator 50. The discharge point for catalyst from reactor 36 is largely immaterial. It may be withdrawn from the base of the reactor but where the reactor is a tall, elongated vessel, certain advantages accrue from withdrawing catalyst at a higher level, for example, at the surface of the dense phase. One of these advantages is that the dense phase level is automatically maintained in this manner. Another advantage of withdrawing catalyst from a high point is that a higher column of catalyst is produced in transfer line 49, thereby establishing a higher catalyst "head," thus assisting transfer of catalyst into regenerator 50. A small amount of steam or inert gas may be introduced into the transfer line 49 by line 51 for the purpose of aerating the catalyst therein and maintaining it in free-flowing condition while at the same time sweeping hydrocarbon vapors from the catalyst and preventing their transfer into regenerator 50. A suitable valve or damper 52 in line 49 at the point of entering regenerator 50 may be employed to regulate the flow of catalyst and maintain a sufficient amount of catalyst in transfer line 49 to act as a seal between the two vessels 36 and 50.

In regenerator 50 the spent catalyst is contacted with an oxygen-containing gas, for example, air introduced by line 53, while the catalyst is maintained in suspension in the upflowing gases. As in the reactor 36, it is desirable to operate the regenerator also in the dense phase which, in the case of activated montmorillonite catalyst, will require an upflowing vapor velocity of about 1 to 4 feet per second. The concentration of catalyst in this phase will usually be within the range of about 10 to 25 pounds per cubic foot. Spent regeneration gases pass out the top of the regenerator through catalyst separator 54 by which any suspended catalyst is separated from the gases and returned by dip leg 55 to the body of catalyst below the dense phase level. Spent gases are discharged by valved line 56 and suitable heat exchange means may be employed for recovering heat therefrom.

The temperature in regenerator 50 is suitably controlled by radiation, direct cooling, by recycling cool gases or cooled catalyst. Excessive regeneration temperature results in impairment of catalyst activity. Temperatures of the order of 1000 to 1200° F. are generally satisfactory, although certain catalysts, such as the synthetic silica-alumina catalysts, may be made to withstand higher temperatures of the order of 1400 to 1600° F.

Regenerated catalyst, preferably after stripping to remove oxidizing gases by means not shown, flows from the bottom of regenerator 50 by line 57 leading back to reactor 36. Steam, hydrocarbon gas or other suitable medium may be introduced by line 58 and employed for conveying the catalyst to the reactor. Fresh catalyst may be introduced into the system at hopper 59 from which it descends through standpipe 60 and thence is introduced into line 57 by steam injected at 61. Standpipe 60 may be of sufficient height to overcome the pressure within the conversion system which may commonly be of the order of 5 to 35 pounds per square inch. Higher pressures are generally undesirable and lead to difficulties in control and operation. The pressures within the reactor and the regenerator are substantially the same, thereby facilitating transfer of catalyst between them. The amount of catalyst transferred from the regenerator to the reactor will commonly be about 1 to 5 times or even 10 times the amount of oil processed.

The catalyst in the system may be recycled several hundred times before its activity falls to such a level that it is uneconomical to longer maintain it in the system. The level of catalyst activity may be sustained by continually withdrawing spent catalyst from the system which I may do by means of catalyst transfer line 62. The catalyst may be withdrawn directly from the reactor whereas I have shown removing it from the spent catalyst line 49. Steam introduced at 63 conveys the spent catalyst to the vaporizer 16 by way of valve 64 where the spent catalyst serves to adsorb inorganic salts and other undesirable impurities from the charging stock as hereinbefore described. Its residual catalytic effect is also useful in accelerating the decomposition of carbon-forming substances. If desired, a portion or all of the spent catalyst stream may be conducted by valved line 65 to the inlet of heater 13 where it may be mixed with the liquid feed stock and passed through the heater coil 14 serving to adsorb carbonaceous matter therein before passing to vaporizer 16. The amount of catalyst transferred in this way from the conversion system to the vaporizer will ordinarily be only a small percentage of the catalyst employed in converting the oil in reactor 36. For example, only 1% of the catalyst employed for contacting the oil in 36 may be thus diverted per cycle, although operating conditions may dictate the diversion of more or less of this amount. For example, $\frac{1}{10}$ of 1% to 5% may thus be employed. Catalyst introduced into vaporizer 16 is recycled therein as previously described and is finally discarded with the combustion gases at 22 or by discard line 28.

As an example of the deleterious effect of salt on an acid treated montmorillonite catalyst, the following results were obtained. A Mid-Continent crude containing 40 pounds of salt per 1000 barrels was distilled to a 20% bottom and charged to the catalyst until, by estimation, the catalyst contained 1% of salt contamination. Impairment of catalyst activity is indicated by the fact that whereas the uncontaminated catalyst produced 47.2% of gasoline from a Mid-Continent gas oil at 900° F., the contaminated catalyst produced only 35.3% and 34% of gasoline under the same conditions.

Although I have described my invention by means of certain specific applications thereof, I intend that the scope be defined only by the following claims.

I claim:

1. The process of converting a salt contaminated heavy hydrocarbon oil into gasoline of high knock rating which comprises injecting the oil into a vaporizing zone, contacting the oil in said vaporizing zone with a hot, suspended, solid, adsorbent material whereby contaminating salts in said oil are adsorbed on said solid adsorbent material and the oil is vaporized and heated to conversion temperature, maintaining said adsorbent material in turbulent motion thereby providing a substantially uniform temperature in the range of about 850 to 1050° F. throughout said vaporizing zone, quickly separating vapor from said adsorbent material before any substantial conversion to gasoline occurs, immediately conducting the vapors while at conversion temperature to a reaction zone containing a suspended, solid hydrocarbon conversion catalyst, whereby the oil is substantially converted into gasoline, recovering gasoline from the products of the conversion reaction withdrawing adsorbent material from said vaporizing zone, contacting it with air in a combustion zone wherein its temperature is raised to about 1200 to 2000° F. by combustion of carbonaceous deposits, separating combustion gases and vaporized salt from said adsorbent material, and maintaining the temperature of said vaporizing zone by continually recycling thereto heated adsorbent material at said temperature of about 1200 to 2000° F.

2. The process of claim 1 wherein catalyst is continually withdrawn from said reaction zone, subjected to combustion with an oxidizing gas in a regeneration zone for a length of time sufficient to substantially remove deactivating carbonaceous deposits therefrom and thence returned to said reaction zone.

3. The process of claim 1 wherein the heavy oil charging stock is a crude oil residuum contaminated with about 25 to 200 pounds of inorganic salts per 1000 barrels.

4. The process of converting a salt-containing, crude residuum to high knock rating gasoline which comprises injecting said residuum into a vaporizing zone containing a suspension of hot adsorbent, solid material in turbulent emotion at a temperature of about 850 to 1050° F., wherein said residuum is vaporized and contaminating salts and carbonaceous matter are adsorbed on said suspended, solid material, separating hot vapors from suspended solids in said vaporizing zone and conducting the vapors while hot to a reaction zone containing a suspended, solid, hydrocarbon, conversion catalyst, introducing sufficient catalyst into said reaction zone to convert a substantial amount of said hydrocarbon residuum to gasoline, separating catalyst and recovering the gasoline from the reaction products, transferring spent conversion catalyst from said reaction zone to a regeneration zone, contacting said catalyst in suspension in said regeneration zone with sufficient air to burn away contaminating, carbonaceous deposits, returning regenerated catalyst while still hot from said regeneration zone to said reaction zone and simultaneously transferring a small portion of the spent catalyst from the reaction zone to said vaporizing zone first mentioned.

5. The process of claim 4 wherein the amount of catalyst transferred from said reaction zone to said vaporizing zone is about 0.1 to 5% of the amount of catalyst contacted with said hydrocarbon vapors in said reaction zone.

6. The process of claim 4 wherein the spent catalyst transferred from said reaction zone is introduced into the said residuum charging stock and the mixture is preliminarily heated in a confined stream before introducing into said vaporizing zone.

7. An apparatus for converting heavy salt-containing hydrocarbon oils into gasoline comprising a vaporizer, a catalytic reactor and a catalyst regenerator, means for dispersing hydrocarbon oil into said vaporizer, means for maintaining a suspension of solid, adsorbent material within said vaporizer, means for separating said solid, adsorbent material from the hydrocarbon vapors produced in said vaporizer, means for burning carbonaceous deposits from said adsorbent material, and a conveyor for returning hot adsorbent material to said vaporizer, a vapor conduit from said vaporizer to said reactor, means for maintaining a suspension of hydrocarbon conversion catalyst in said reactor, means for continually withdrawing spent hydrocarbon, conversion catalyst from said reactor to said regenerator and for returning regenerated catalyst from said regenerator to said reactor, means for introducing an oxidizing gas into said regenerator in an amount sufficient to burn carbonaceous deposits from said catalyst, means for separating and discharging spent regeneration gases from said regenerator, means for separating hydrocarbon conversion products from the catalyst in said reactor and for recovering gasoline from said products, means for continuously transferring a small amount of spent catalyst from said reactor to said vaporizer and means for supplying fresh catalyst to said reactor to make up for the amount of spent catalyst thus transferred.

SAM B. BECKER.